ary Examiner—William R. Cline
Attorney, Agent, or Firm—Walter Becker

United States Patent [19]
Werner

[11] 3,920,035
[45] Nov. 18, 1975

[54] FILLING VALVE FOR HYDRODYNAMIC TRANSMISSION ELEMENTS

[75] Inventor: Reinhold Werner, Oberstedten, Germany

[73] Assignee: Klockner-Humboldt-Deutz AG, Cologne, Germany

[22] Filed: May 9, 1974

[21] Appl. No.: 468,565

[30] Foreign Application Priority Data
May 10, 1973 Germany............................ 2323550

[52] U.S. Cl............... 137/117; 137/468; 239/92 C
[51] Int. Cl.²..................... G05D 11/00; F16K 11/00
[58] Field of Search.................... 137/115, 117, 468; 236/92 C

[56] References Cited
UNITED STATES PATENTS

| 2,859,762 | 11/1958 | Banker............................ 137/115 X |
| 3,307,568 | 3/1967 | Gartner............................... 137/115 |
| 3,332,436 | 7/1967 | Welty................................. 137/468 |
| 3,428,251 | 2/1969 | Gross et al....................... 137/468 X |

Primary Examiner—William R. Cline
Attorney, Agent, or Firm—Walter Becker

[57] ABSTRACT

A filling valve for hydrodynamic transmission elements, e.g. a hydrodynamic coupling or a hydrodynamic converter, which partially controls a speed dependent volume stream in conformity with the speed of rotation. A hollow spring-loaded control piston which is axially displaceable in a control bushing has one of its end faces actuated by the volume stream of a filling pump against the thrust of the spring acting thereupon while the outside of the other end face of the hollow piston communicates through a throttle bore with the interior of the hollow piston. The interior of the hollow piston is adapted through control slots in the circumferential surface of the piston to respectively communicate with a feeding line leading to the transmission elements and with a return line. Temperature responsive means are provided adjacent to and for cooperation with said throttle bore for increasing the free crossection of the throttle bore in response to a decreasing temperature and for decreasing the free crossection of the throttle bore in response to an increasing temperature.

1 Claim, 1 Drawing Figure

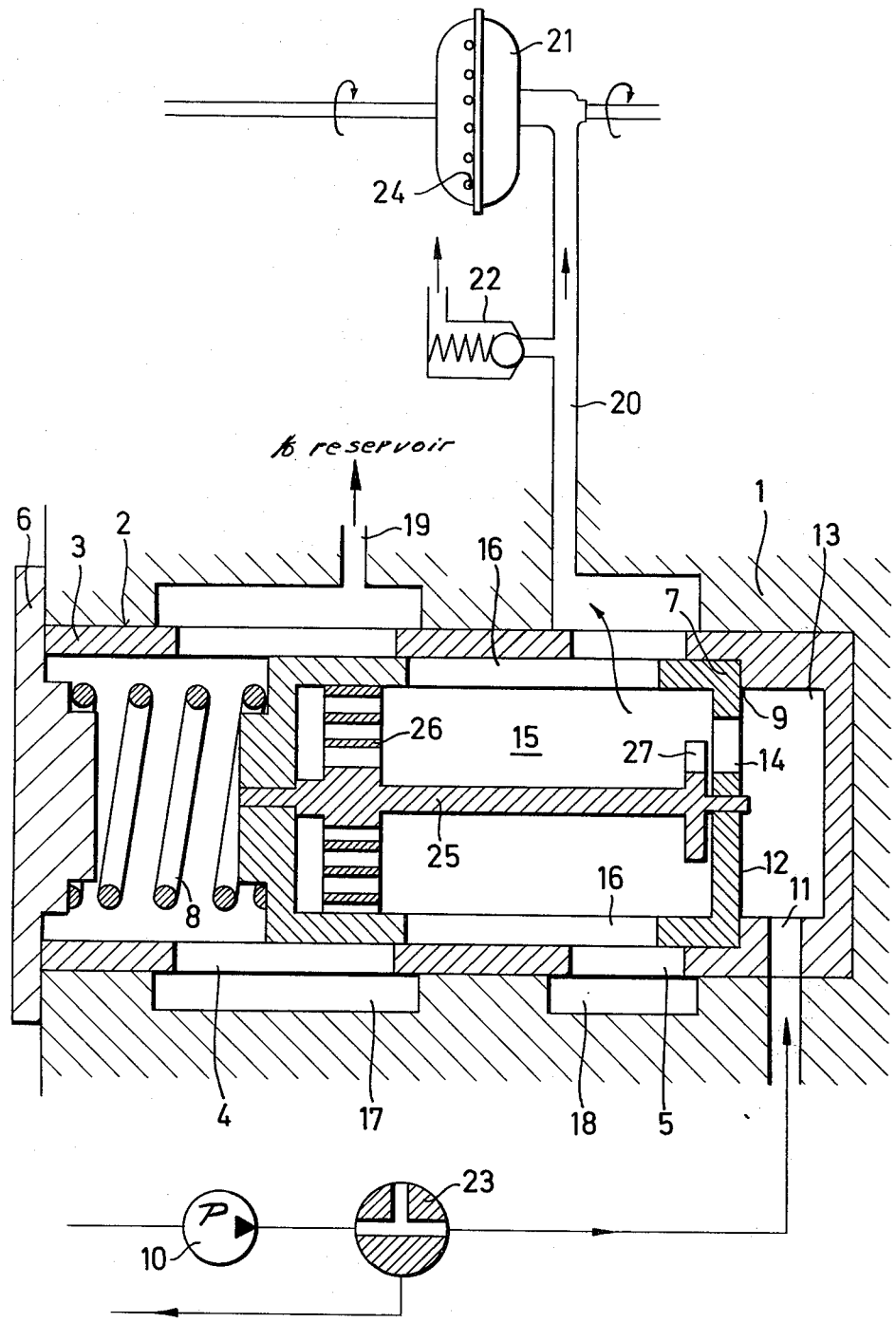

FILLING VALVE FOR HYDRODYNAMIC TRANSMISSION ELEMENTS

The present invention relates to a fill-up valve for hydrodynamic transmission elements, such as a hydrodynamic clutch or coupling or a hydrodynamic converter, which partially controls a speed dependent volume stream in conformity with the speed.

A fill-up valve of this type is disclosed in German Patent No. 835,839. This known valve is adapted to vary the filling and thereby the transmittable torque of the hydrodynamic transmission elements. In this way the fill-up valve regulates the volume stream of a filling pump, while the end face of said valve is acted upon by a speed measuring pump against the force of a spring and activates a return conduit. An additional return conduit branches off from the delivery or pressure line of the speed measuring pump. An orifice plate is provided in said additional conduit so that a speed dependent pressure is built up in the delivery line of the speed measuring pump. This known device is very expensive to make and does not take into account that the pressure drop at the orifice plate increases with increasing viscosity at lower temperatures of the working medium.

It is an object of the present invention by simple means to avoid the above mentioned drawbacks.

This object and other objects and advantages of the invention will appear more clearly from the following specification in connection with the accompanying drawing which shows a longitudinal section through the fill-up valve according to the present invention.

The device according to the present invention is characterized primarily in that the end face of a hollow, spring-loaded control piston, which is axially displaceable in a control bushing, is acted upon by the volume stream from the filling pump against the force of the spring. Said end face of the piston is in communication with the interior of the distributing slide valve servo-piston by means of a restrictor. The servo-piston in turn, by means of control slots arranged around the circumference, is, depending on conditions of operation, connected to the supply conduit leading to the transmission elements or is connected to the supply conduit and to a return conduit leading to the tank containing working fluid.

According to a further specific embodiment of the present invention, the speed measuring pump need not be used. In addition, the control elements are arranged spatially convenient to each other and may be produced and mounted in a simple manner.

According to yet another specific embodiment of the present invention, the flow through cross section of the restrictor changes in conformity with the temperature. This allows for the adjustment of viscosity changes of the working medium in conformity with the temperature. This is effected in a simple manner by mounting a rotary slide valve within the servo-piston. This slide valve is connected to a bimetal spring and activates the restrictor to a greater or lesser degree.

FIG. 1 provides a schematic diagram illustrating features of the present invention including particularly a filling valve for hydrodynamic transmission elements.

Referring now to the drawing in detail, the device shown therein comprises a housing 1 of the fill-up valve, a bore 2 within the housing 1, and a guide sleeve or bushing 3, on the circumference of which are located control openings 4 and 5. Both the bore 2 and the bushing 3 are closed off by a lid 6. Within said sleeve 3, a hollow control slide valve servo-piston 7 is guided so as to be axially displaceable. The servo-piston 7 has one end resting against the lid 6 through the intervention of a spring 8. The opposite end of the piston 7 rests against shoulder 9 of the sleeve 3. The working medium is supplied to the fill-up valve by a displacement type filling pump 10 in a speed dependent volume stream, through a passage 11. The working medium acts upon that end 12 of the piston 7 which is remote from the spring 8. The end 12 of the piston 7, along with the sleeve 3, form a housing chamber 13. A restrictor in the form of a choke bore 14 is provided in the end 12 of the piston 7. Said bore 14 establishes communication between the housing chamber 13 and the interior 15 of the hollow servo-piston 7. Control slots 16 are arranged on the circumference of the servo-piston 7. These slots 16 work in cooperation with the control openings 4 and 5, which latter lead to annular chambers 17 and 18, respectively. These chambers 17 and 18 communicate respectively with a return conduit 19, which leads to a tank (not shown), and with a supply conduit 20 which leads to a hydrodynamic converter 21. The supply conduit 20 is provided with a relief-valve 22. The passage 11 is controlled by a shut-off valve 23.

The fill-up valve operates as follows: the working medium supplied by the filling pump 10, in a speed dependent volume stream passes through the passage 11 into the chamber 13, where it acts upon the end 12 of the servo-piston 7. From there the working medium flows through the throttle bore 14, control slots 16, the guide openings 5, annular chamber 18, and the supply conduit 20 to the hydrodynamic converter 21. The converter housing is provided with bores 24 through which the working medium flows back to the storage tank (not shown). The filling of the converter 21 results from the difference in the amounts of the supplied and returned fluid.

The pressure drop at the throttle bore 14 increases as the volume stream increases, thereby causing the servo-piston 7 to move against the thrust of the spring 8. By means of the size of said bore 14 as well as the force of the spring 8, the speed at which the servo-piston 7 is moved against the spring 8 can be determined. By displacing the servo-piston 7 towards the spring 8, the flow-through cross section of the control openings 5 will be reduced, while the control openings 4 communicate with the control slots 16 and a portion of the volume stream is shunted off through the control openings 4, the annular chamber 17, and the return conduit 19 to the storage tank (not shown). The amount of working medium supplied to the hydrodynamic converter 21 is coordinated with the amount of working medium withdrawn therefrom in such a way that, from a specific predetermined speed on, the power input of the hydrodynamic converter slowly rises, remains constant, or decreases, depending upon the requirements.

By changing the position of the control slots and openings, it is also possible to only partially fill the hydrodynamic converter below a predetermined speed.

A rotary slide valve 25 is mounted in the inner chamber 15 of the hollow servo-piston 7. The slide valve 25 is adjusted by means of a coiled or wound bimetal spring 26 in such a way that, with the aid of a slot 27, the throttle bore 14 is kept open to a greater or lesser degree in conformity with the temperature of the working medium.

It is, of course, to be understood that the present invention is, by no means, limited to the specific showing of the drawing, but also comprises any modifications within the scope of the appended claims.

What I claim is:

1. A fill-up valve for hydrodynamic transmission elements, especially hydrodynamic couplings and torque converters, for controlling a speed dependent volume current of fluid dependent to flow being partially diverted under control thereby in conformity with the speed of said hydrodynamic transmission elements, which includes in combination: cylinder means closed at both ends, hollow valve spool means reciprocable in said cylinder means, abutment means arranged in said cylinder means in spaced relationship to one end of said cylinder means for limiting movement of said valve spool means toward said one end of said cylinder means, preloaded spring means interposed between the other end of said cylinder means and the adjacent end of said valve spool means and continuously urging said valve spool means toward said abutment means, said first mentioned one end of said cylinder means defining with the adjacent end wall of said valve spool means a control chamber, and said last mentioned end wall of said valve spool means having a throttle bore therethrough for establishing necessarily regulated communication between said control chamber and the interior of said valve spool means, first conduit means leading into said control chamber for conveying thereinto actuating fluid for said hydrodynamic means, said valve spool means and said cylinder means having therebetween means forming a peripheral control slot means necessarily for regulation of variable communication with each other in conformity with the position of said valve spool means relative to said cylinder means, second and third conduit means respectively communicating with said peripheral slot means of said cylinder means for respectively conveying fluid to said hydrodynamic transmission means and to a reservoir, temperature responsive means adjacent to and for cooperation with said throttle bore for increasing the free cross section of said throttle bore in response to a decreasing temperature and for decreasing the free cross section of said throttle bore in response to an increasing temperature, said temperature responsive means including a rotary valve member and bimetal spring means associated with said rotary valve means for varying the position of the latter relative to said throttle bore to thereby vary the free cross section of said throttle bore.

* * * * *